(12) United States Patent
Stone et al.

(10) Patent No.: US 10,282,103 B1
(45) Date of Patent: May 7, 2019

(54) METHOD AND APPARATUS TO DELETE A COMMAND QUEUE

(71) Applicant: Seagate Technology LLC, Cupertino, CA (US)

(72) Inventors: Chris Randall Stone, Elgin, TX (US); Shashank Nemawarkar, Austin, TX (US); Balakrishnan Sundararaman, Austin, TX (US); Charles Edward Peet, Austin, TX (US)

(73) Assignee: Seagate Technology LLC, Cupertino, CA (US)

( * ) Notice: Subject to any disclaimer, the term of this patent is extended or adjusted under 35 U.S.C. 154(b) by 109 days.

(21) Appl. No.: 15/141,744

(22) Filed: Apr. 28, 2016

Related U.S. Application Data

(63) Continuation-in-part of application No. 14/936,573, filed on Nov. 9, 2015, now Pat. No. 9,996,262.

(51) Int. Cl.
*G06F 13/24* (2006.01)
*G06F 3/06* (2006.01)

(52) U.S. Cl.
CPC ............ *G06F 3/061* (2013.01); *G06F 3/0659* (2013.01); *G06F 3/0679* (2013.01); *G06F 13/24* (2013.01)

(58) Field of Classification Search
CPC ...... G06F 3/061; G06F 3/0659; G06F 3/0679; G06F 13/24
See application file for complete search history.

(56) References Cited

U.S. PATENT DOCUMENTS

| | | | |
|---|---|---|---|
| 7,836,269 B2 | 11/2010 | Obereiner et al. | |
| 9,052,835 B1 | 6/2015 | Darrington et al. | |
| 9,122,401 B2 | 9/2015 | Zaltsman et al. | |
| 2004/0264284 A1* | 12/2004 | Priborsky | G06F 3/0605 365/232 |
| 2006/0149940 A1 | 7/2006 | Mukherjee | |
| 2009/0113430 A1 | 4/2009 | Riley | |
| 2009/0327638 A1 | 12/2009 | Buch | |
| 2010/0262738 A1* | 10/2010 | Swing | G06F 3/0613 710/260 |
| 2012/0246435 A1 | 9/2012 | Meir et al. | |
| 2013/0067143 A1* | 3/2013 | Hasegawa | G06F 3/0611 711/103 |
| 2014/0331001 A1 | 11/2014 | Liu et al. | |
| 2015/0234601 A1* | 8/2015 | Tsai | G06F 3/0611 711/103 |

* cited by examiner

*Primary Examiner* — Tim T Vo
*Assistant Examiner* — Harry Z Wang
(74) *Attorney, Agent, or Firm* — Cesari & Reed, LLP; Kirk A. Cesari; Christian W. Best

(57) ABSTRACT

Systems and methods are disclosed to delete a command queue, in accordance with certain embodiments of the present disclosure. An apparatus may comprise a circuit configured to receive a queue deletion indicator from a host device, including a queue identifier for a selected command queue to be deleted. The circuit may abort each command associated with the selected command queue and pending at the apparatus based on the queue identifier. Commands associated with the selected queue may be identified in a command table and flagged with an abort bit, which may signal an I/O processing pipeline to abort the command when encountered. The circuit may verify that no commands associated with the selected command queue remain pending at the apparatus, and send a completion indicator to notify the host device that the selected command queue is deleted.

19 Claims, 5 Drawing Sheets

METHOD AND APPARATUS TO DELETE A COMMAND QUEUE

CROSS-REFERENCE TO RELATED APPLICATION

The present application is a continuation-in-part of and claims priority to pending U.S. patent application, application Ser. No. 14/936,573, filed Nov. 9, 2015, entitled "Method and Apparatus to Abort a Command", the contents of which are hereby incorporated by reference in their entirety.

SUMMARY

In certain embodiments, an apparatus may comprise a circuit configured to receive a queue deletion indicator from a host device, the queue deletion indicator including a queue identifier for a selected command queue to be deleted. The circuit may abort each command associated with the selected command queue and pending at the apparatus based on the queue identifier, verify that no commands associated with the selected command queue remain pending at the apparatus, and send a completion indicator to notify the host device that the selected command queue is deleted.

In certain embodiments, an apparatus may comprise a storage control circuit configured to receive a queue deletion command from a host device, the queue deletion command including a queue identifier for a selected command queue to be deleted. The storage control circuit may abort each command associated with the selected command queue and pending at the apparatus based on the queue identifier, and send a completion indicator to notify the host device that the selected command queue is deleted after each command associated with the selected command queue is aborted.

In certain embodiments, a method may comprise receiving a queue deletion command at a controller circuit from a host device, the queue deletion command including a queue identifier for a selected command queue to be deleted. The method may include aborting each command associated with the selected command queue and pending at the controller circuit based on the queue identifier, and sending a completion indicator to notify the host device that the selected command queue is deleted after each command associated with the selected command queue is aborted.

DETAILED DESCRIPTION

In the following detailed description of certain embodiments, reference is made to the accompanying drawings which form a part hereof, and in which are shown by way of illustration of example embodiments. Features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods and functions described herein may be implemented as a device, such as a computer usable medium having computer readable program code means embodied therein or a memory device storing program code or firmware, that includes instructions that when executed, cause a processor device to perform the methods.

Host devices, such as server devices, desktop computers, laptop computers, etc. may issue commands to attached devices, such as data storage devices (DSDs). The commands may include input or output (I/O) commands (e.g. read, write, or erase data storage commands), administrative commands (e.g. commands to identify the attached device, determine device features, set parameters for the device, configure command queues, etc.), or other types of commands. The commands may be placed into command queues by the host device, and an attached device may retrieve the commands from the command queues for execution.

At times, a host device may issue a command to selectively delete a command queue. For example, a host application associated with the queue may have been terminated, a command in the queue may have timed out, or the host may determine that a parameter of a queue should be modified via deleting and re-initiating the queue. An attached DSD may delete the command queue by aborting all commands from that queue.

However, locating and terminating specific commands may be difficult. A DSD may have one or more controller functions, with each having one or more associated command queues. A data storage device may be processing thousands of commands, from multiple queues across multiple controller functions, executed out-of-order from the order in which they were placed into command queues. In order to improve performance of the DSD, a selected queue may be deleted and the associated commands aborted without interfering with the execution of other commands from other command queues. An example system configured to address problems related to command queue deletion and command aborting is depicted in FIG. 1.

Figure 1:
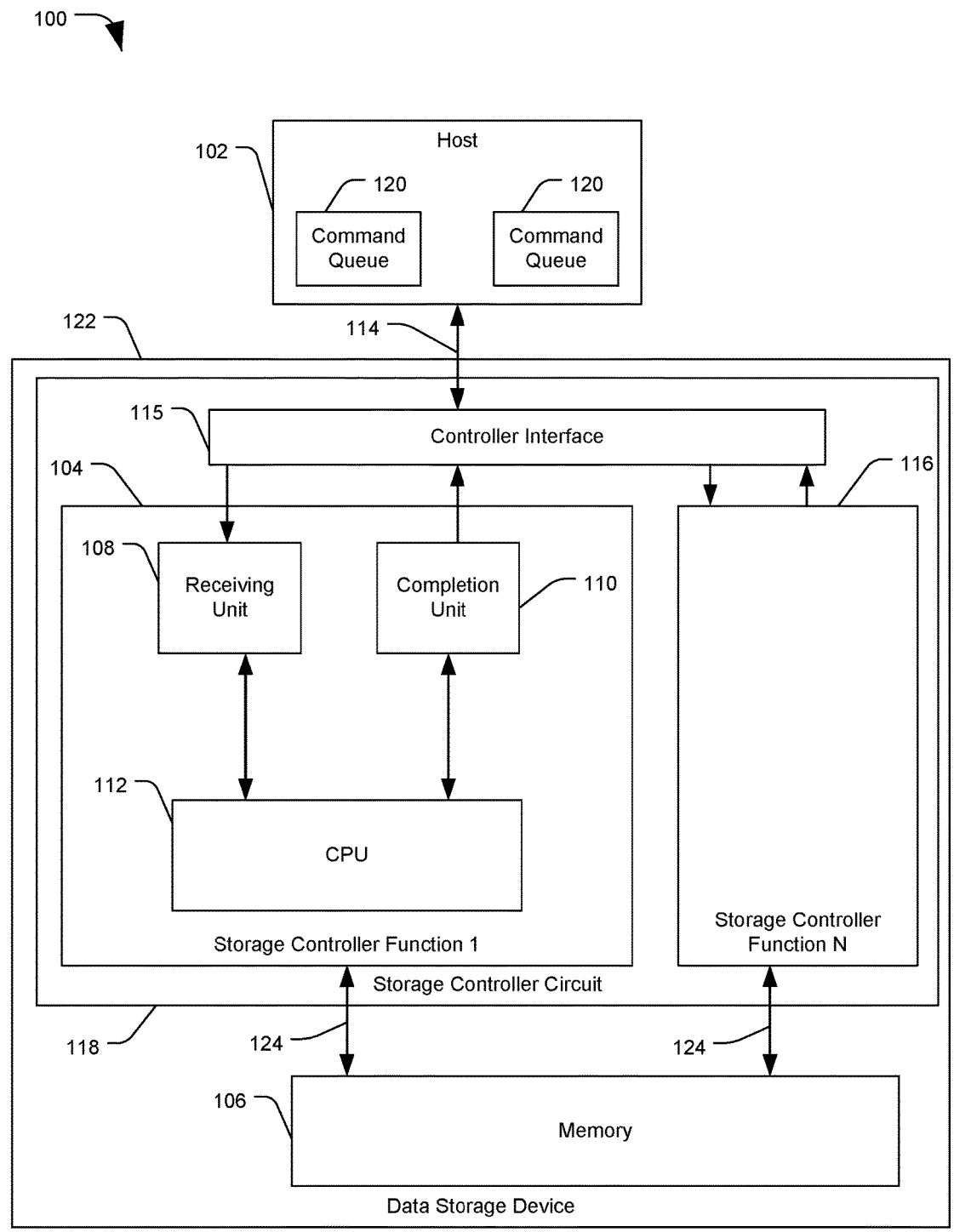
FIG. 1 is a diagram of a system configured to delete a command queue, in accordance with certain embodiments of the present disclosure.

FIG. 1 is a diagram of a system 100 configured to delete a command queue, in accordance with certain embodiments of the present disclosure. System 100 may include a host 102, a host interface 114, a data storage controller circuit 118, and a memory 106. The host interface 114, storage controller circuit 118, and memory 106 may together comprise a data storage device (DSD) 122, such as a solid state drive (SSD), a hard disc drive (HDD), or a combination thereof. The storage controller circuit 118 may be a data storage controller configured to control access to a single memory 106 (e.g. a set of Flash die or a stack of hard disc platters), or the storage controller circuit 118 may control access to a plurality of homogeneous or heterogeneous memories, such as in a network attached storage (NAS) environment.

The host 102 may include one or more server devices, desktop or laptop computers, tablets, smartphones, or other computing devices. The host 102 may issue commands, such as input-output (I/O) commands, which are received by the DSD 122 at host interface 114. The host interface 114 may include any wired or wireless communication interface, such as universal serial bus (USB), Wi-Fi, Ethernet, Bluetooth, or other communication interfaces. The DSD 122 may process the I/O commands and initiate read, write, erase, or other operations at memory 106. The DSD 122 may return a command status indicator to the host 102 once the command has completed or otherwise terminated.

The DSD 122 may include a plurality of storage controllers. Storage controllers may be implemented as hardware, firmware, or a combination thereof. The DSD 122 may include multiple physical controller circuits, a single controller circuit 118 implementing multiple individual controller functions 104 and 116, multiple controller circuits at least some of which implement multiple controller functions, or any combination thereof. As used herein, "storage controller" may refer to individual storage controllers, whether implemented as individual circuits or storage controller functions.

The storage controller circuit 118 may be a controller for a nonvolatile memory express (NVMe)-based storage device 122 configured to communicate with the external host 102 via a host interface 114 and a controller interface 115, such as a peripheral component interconnect express (PCIe) communication bus. NVMe is a specification for accessing some non-volatile memory devices, such as SSDs, HDDs, hybrid devices including multiple types of storage mediums, or any combination thereof. The NVMe specification offers functionality which takes advantage of the low latency and parallelism provided by SSDs and PCIe communication.

The storage controller circuit 118 may include one or more control circuits, processors, memories (e.g. non-volatile memory, Dynamic Random Access Memory (DRAM), other types of memory, or any combination thereof), communication busses, other components, or any combination thereof. The storage controller circuit 118 may execute firmware or software to facilitate the execution of storage controller functions.

The storage controller 118 may implement a plurality of storage controller functions, such as storage controller function 1 104 through storage controller function N 116. Each storage controller function may include components, including firmware and hardware, configured to process commands from a host 102 and access one or more memories 106 of the data storage device 122 via one or more memory interfaces 124. Memory interfaces 124 may include busses or other communication channels for transmitting data between the storage controller circuit 118 and memories 106 of the DSD 122. Storage controller 104 may include a receiving unit 108, a completion unit 110, and a central processing unit (CPU) 112. The receiving unit 108, completion unit 110, and CPU 112 may include one or more chips, integrated circuit (ICs), or other circuits, and may additionally include software or firmware to control one or more operations.

The receiving unit 108 may be configured to receive commands from the host 102 via the host interface 114 and controller interface 115, and determine how or where to direct the command within the storage controller 104. Commands received by the receiving unit 108 may be directed to a buffer memory or command queue of the DSD 122, directed to the CPU 112, or otherwise routed for further processing. The host 102 may transmit a command indicator, such as a "doorbell" signal, notifying the storage controller 104 that a command is pending and identifying how or where the command may be retrieved at the host 102. The receiving unit 108 may receive the command indicator, and then retrieve the identified command from the host 102. For example, commands from a host may be placed into a command queue 120 at the host device 102. Command queues 120 may include submission queues for commands submitted by the host 102 for processing at the DSD 122, and completion queues to which the DSD 122 may store information regarding the status of a host command processed by the DSD 122. After receiving a command indicator from the host 102, the receiving unit 108 may retrieve a corresponding command from a submission command queue 120 of the host 102. The command queues 120 can also be located at the DSD 122, with the host 102 issuing commands to the DSD 122 to be placed into a particular queue 120.

The controller interface 115 may include logic, e.g. a PCIe arbiter, to direct commands or indicators from the host interface 114 to the receiving unit 108 of the appropriate storage controller. The DSD 122 may include one or more receiving units 108 and completion units 110, with each unit having registers, queues, interfaces, or other components for each storage controller of the DSD 122. The controller interface 115 or receiving unit 108 may determine which controller a command is directed to, and may handle the command accordingly. All I/O commands for a storage controller 104 may pass through the associated receiving unit 108, and therefore the receiving unit 108 may be a first "gatekeeper" for received host commands.

The completion unit 110 may be configured to transmit, to the host 102, a status indicator for commands received from the host 102. For example, the completion unit 110 may receive a notification from the CPU 112 or another component of the storage controller 104 that an I/O operation has been completed successfully. The completion unit 110 may then store the related command identifier (ID) to a completion queue on the host 102, to notify the host that the command was completed successfully. The completion unit 110 may optionally transmit data requested by a command, such as a file or data associated with a read request. Read data may also be stored to the host 102 by another component of the DSD 122, for example before the completion unit 110 notifies the host 102 that the data has been read and stored to the host 102 successfully. The completion unit 110 may receive a notification from other components of the storage controller 104 for most or every completed command which was received from the host 102, and may thereby act as a final "gatekeeper" for completed host commands processed by the storage controller 104.

The CPU 112 may perform processing for received commands, control the operation of components of the storage controller 104, control or generate signals or commands to devices attached to the storage controller 104 such as memory 106 or host 102, perform other operations, or any combination thereof.

The host 102 may issue a command or other indicator to the DSD 122 to delete one or more selected command queues 120. The command may be a queue deletion indicator and include a queue identifier for the selected command queue to be deleted. For example, the host may direct the DSD 122 to delete one or more submission queues, one or more submission queues and an associated completion queue, or another combination of queues. Each command queue 120 may be associated with a particular storage controller, such as storage controller function 1 104. In response to the command queue deletion command, the associated storage controller 104 may abort all pending commands associated with the selected command queue 120, without interfering with the execution at the storage controller 104 of commands from other command queues, or with the operation of other storage controllers 116 of the DSD 122.

In order to explain a process for aborting commands at the DSD 122 as part of the queue deletion process, an explanation of an example method for processing commands at the DSD 122 using a command table will be provided. A method of receiving commands for processing and generating entries in a command table is discussed in relation to FIG. 2.

Figure 2:
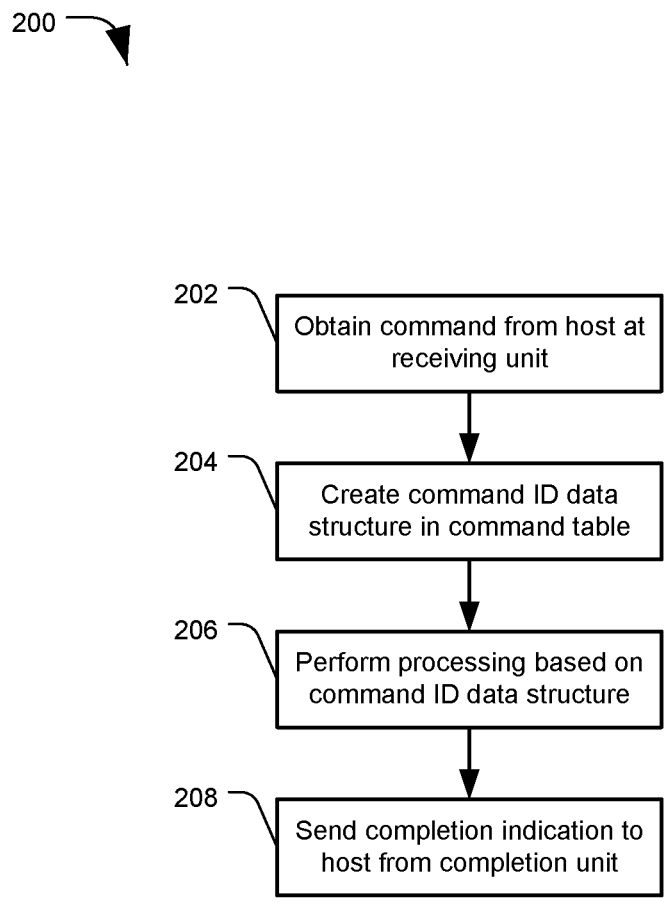
FIG. 2 is a flowchart of a method to delete a command queue, in accordance with certain embodiments of the present disclosure.

FIG. 2 is a flowchart of a method 200 to receive and process a command, in accordance with certain embodiments of the present disclosure. The method 200 may include a method for processing an input/output (I/O) command at a storage controller, such as storage controller 104 of FIG. 1. The method 200 may include obtaining a command from a host at a receiving unit of a storage controller, at 202. The receiving unit may correspond to receiving unit 108 of FIG. 1. The method 200 may include receiving a command "doorbell" or other indicator that a host command is ready. The indicator may include information about a pending command, such as a command ID and a submission queue ID indicating a command queue from which the pending command may be retrieved. Obtaining a command, at 202, may include retrieving a pending command from a submission queue at the host.

The method 200 may include creating a command ID data structure in a command table stored at the storage controller, at 204, based on the command obtained at 202. For example, the storage controller may maintain a table in an SRAM or other memory of the storage controller. The table may include a set of command ID data structures, pointers to command ID data structures, or may otherwise include information on commands received for execution. The command ID data structure may include the command obtained from the host and other associated control information. For example, the command ID data structure may include the command ID and submission queue ID (SQ ID) received from a host, a storage controller identifier for the storage controller associated with the submission queue having the SQ ID, the type of command, data to read or write or a storage location therefor, an indicator of whether the command is still valid, an abort bit or flag indicating whether the command has been marked for aborting, other information, or any combination thereof. The command table may be accessed by components of a processing pipeline within the storage controller to determine or update the status of commands during processing.

The method 200 may include performing processing based on the command ID data structure, at 206. Circuits or modules of an I/O pipeline may access the command table to determine the type of command and how to proceed with processing. For example, a cache module may consult the command table to determine that a read command was received from a host, the read command including an LBA (logical block address) range to read from the DSD. The cache module may determine whether the LBA range is at least partially stored to a cache memory (e.g. a DRAM connected to the storage controller). If so, the cache module may direct retrieval of the data from the cache memory and storing the data to the host. If the requested LBA range was not completely stored in the cache, the cache module may notify a Flash access module of the pending command. The Flash access module may consult the command table to determine LBAs to retrieve per the command, and may send instructions to a Flash memory connected to the storage controller to retrieve the designated LBAs and store the associated data to the host. Other processing may also be performed.

The components of the processing pipeline may check whether an "abort bit" is set for the current command. If it is, the component may abort processing of the command, may notify the CPU that the command was aborted, may update a status of the command in the command table, may perform other functions, or any combination thereof.

Once the processing for a command is completed, the completion unit may send an indication to the host, at 208, such as by storing information on the completed command to a completion queue of the host device. If the command was aborted, the completion unit may send a completion indication for the abort command associated with the aborted command. Instead of or in addition to sending a completion indication for the abort command, the completion unit may send an abort indication for the aborted command itself. For example, if command ID 1234 was aborted, the completion unit may store an indicator in a host completion queue, such as "Command ID:1234; Status: Aborted". An example embodiment of a storage controller including an I/O pipeline is depicted in FIG. 3.

Figure 3:
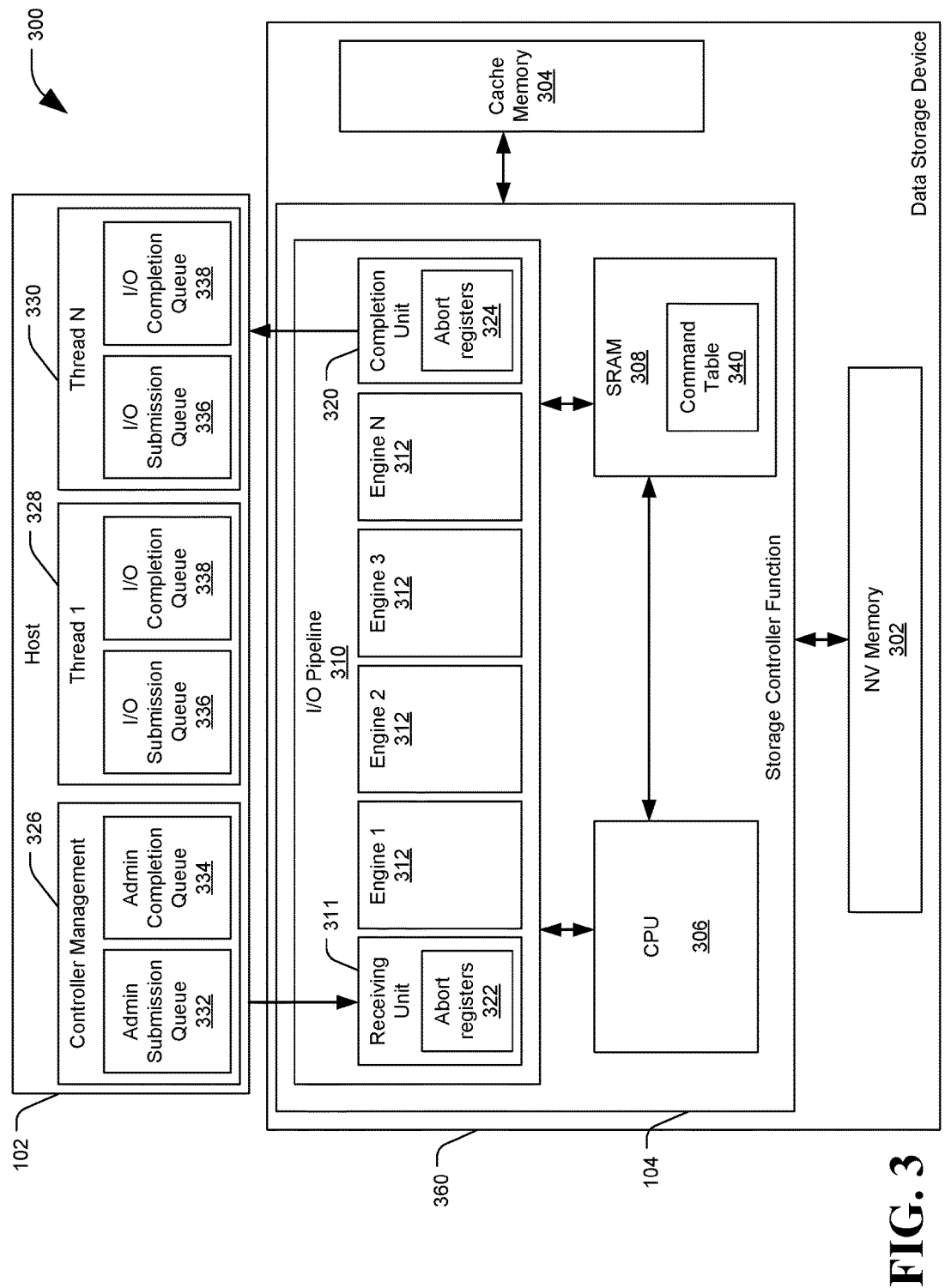
FIG. 3 is a diagram of a system configured to delete a command queue, in accordance with certain embodiments of the present disclosure.

FIG. 3 is a diagram of a system 300 configured to delete a command queue, in accordance with certain embodiments of the present disclosure. System 300 may include a host 102 and data storage device (DSD) 360 including one or more storage controller functions 104. The host and storage controllers of system 300 may correspond to host 102 and storage controller function 1 104 of FIG. 1, respectively. As stated above, a storage controller function 104 may be referred to as simply a 'storage controller', and one or more storage controllers may be included on a single or multiple storage controller circuits of the system 300.

The storage controller 104 may include a CPU 306, an SRAM 308, and an input-output (I/O) pipeline 310. The storage controller 104 may be configured to receive commands from the host 102 at a receiving unit 311, process the received commands using the I/O pipeline 310 and CPU 306, and return a result to the host 102 via a completion unit 320. The storage controller 104 may be connected to one or more primary nonvolatile (NV) memories 302, such as a Flash solid state memory or a hard disc drive (HDD), one or more cache memories 304 such as dynamic random access memory (DRAM), other memories or components, or any combination thereof. The storage controller 104, NV memory 302, and cache memory 304 may be included within a casing or housing of the data storage device (DSD) 360, which may be removable from host 102.

The CPU 306 may be used for general processing, for managing or coordinating processes within the storage controller 104, for other operations, or any combination thereof. The SRAM 308 may include operating memory for use by the storage controller 104 during processing and operation. For example, the SRAM 308 may store a command table 340 storing information regarding commands received for processing by the storage controller 104. The command table 104 may correspond to the command table described in regards to FIG. 2.

The receiving unit 311 may receive commands from the host 102, may receive an indicator that a command is available and then retrieve the command from the host 102, or may otherwise obtain commands for processing. The receiving unit 311, or another component, may generate a command ID data structure based on received commands, and store the command ID data structure to the command table 340. Both I/O commands from I/O submission queues 336 and admin commands from admin submission queues 332 may have corresponding command ID data structures added to the command table. The receiving unit 311 may direct the command to a next component in the I/O pipeline 310 for processing, such as by sending the component an indicator to retrieve information on the command from the command table 340 and perform processing. The completion unit 320 may receive a notification when the storage controller 104 has finished processing a command, and may send a notification to the host 102 that the command has been executed.

The I/O pipeline 310 may include a number of components or processing engines 312 configured to receive, process, and return a status for I/O commands received from the host 102. The engines 312 may include modules configured to perform one or more processing tasks related to a received command. In the depicted embodiment of FIG. 3, the I/O pipeline 310 may include N engines 312 in addition to the receiving unit 311 and the completion unit 320. A command received by the storage controller 104 may be handled by one or more of the N engines 312 in the I/O pipeline 310. For example, a command may be handled by each engine 312 in sequence, starting with engine 1 and ending with engine N, before the status of the command is reported to the host 102 by completion engine 320. The engines 312 may perform tasks such as checking a cache memory 304 for requested data, buffering commands pending execution, accessing attached memory components such as NV memory 302, performing other operations, or any combination thereof. Data may be passed between engines 312 of the I/O pipeline and between other components of the storage controller 104 via one or more data busses. Status and data related to commands may be retrieved from the command table 340 by the engines 312. The engines 312 and functions described herein are exemplary, and components and functions may be changed, added, or removed without departing from the scope of the present disclosure.

The storage controller 104 may be a nonvolatile memory express (NVMe) controller configured to receive commands through a Peripheral Component Interconnect Express (PCIe) bus, and may be configured to support parallel operation and multiple host command queues. NVMe devices may be configured to work with a paired submission queue (SQ) 336 and completion queue (CQ) 338 mechanism. SQs 336 and CQs 338 are examples of command queues and may be allocated and located in the host's 102 memory, for example in the form of circular buffers with a fixed slot size. Commands to be executed by the storage controller 104 may be placed into the SQs 336 by software or operating systems of the host 102. Commands may be retrieved from SQs 336 by the storage controller 104 (e.g. via the receiving unit 311). Completed command indicators or notifications may be placed into an associated CQ 338 by the storage controller 104 (e.g. via the completion unit 320). Multiple SQs 336 may share a CQ 338, so that completion indicators for commands from the multiple SQs 336 may be placed into the same associated CQ 338. SQs 336 and CQs 338 may be associated with a single storage controller 104 of the DSD 360, so that each command queue has one associated storage controller 104, but each storage controller 104 may have multiple associated command queues.

The host 102 may include one or more processing threads for handling SQs 336 and CQs 338. Each thread may handle one or more SQ 336 and CQ 338. The processing threads may include a controller management or "admin" thread 326, and additional processing threads 1 328 to processing thread N 330. The processing threads may be computing modules, where a "module" may be one or more physical components of a computing device (e.g., circuits and memories) configured to perform a particular task or job, or it may be a program that, when executed, causes a processor to perform the particular task or job. In the depicted embodiment the modules may be software processing threads or processor cores of a physical processing unit. Controller management module 326 may include one of the N processing threads, a separate processor circuit, a control module executed by one of N processing cores, another component, or any combination thereof.

Input-output (I/O) SQs 336 and CQs 338 may be used for data access commands, such as read commands, write commands, erase commands, other data access commands, or any combination thereof. The host 102 may also generate administrative, or "admin," SQs and CQs, such as admin SQ 332 and admin CQ 334 of the controller management module 326. Admin SQs 332 and CQs 334 may be used for admin commands from an administrative command set. Admin commands may be used for device management and control. For example, admin commands may be used to create and delete I/O SQs 336 and CQs 338, abort commands, identify an attached device (e.g. storage controller 104 or its associated data storage device), set device parameters, perform other administrative operations, or any combination thereof.

The host 102 may generate a command and place it as an entry into a submission queue, such as admin SQ 332 or I/O SQ 336. The command may include a command ID, a submission queue ID (SQID) identifying the SQ into which the command is placed, information identifying data to store to or retrieve from a storage device, other information, or any combination thereof. For example, a write I/O command may include the location of data stored to the host, which data can then be retrieved and stored to NV memory 302. A command to delete a SQ 336 may include its own command ID and SQ ID, and may also include the SQ ID for the selected queue to be deleted.

After placing a command into an SQ, the host 102 may send the storage controller 104 a "doorbell" or other indicator that a command is pending in an SQ. For example, the host 102 may update a doorbell register of the storage controller 104 associated with a submission queue when there are new commands to execute. A previous doorbell register value may be overwritten in the storage controller 104 when there is a new doorbell register write associated with a given submission queue. The receiving unit 311 may include one or more doorbell registers, such as one or more registers which can be associated with each submission queue, up to a maximum number of submission queues supported by the storage controller 104. The receiving unit 311 may then fetch a command from the submission queue based on the doorbell register. The storage controller 104 may fetch commands from the host 102 in an order specified by the submission queue associated with the doorbell register (i.e. retrieving commands from a head of the queue), but execute received commands in any order.

As described above, a host 102 may issue a command to delete one or more command queues, such as SQ 336 and CQ 338 associated with Thread 1 328. In some embodiments, every SQ 336 requires an associated CQ 338, but there may be multiple SQs 336 for a single CQ 338. Accordingly, a SQ 336 may be deleted without deleting a CQ 338. A host may direct the deletion of all SQs associated with a CQ while not deleting the CQ, so that other SQs may be created and associated with the CQ. The host may specify in the queue deletion command which SQs 336, CQs 338, or both are to be deleted. The host may put the queue deletion command into the admin submission queue 332, from which it may be obtained by the storage controller 104.

Deletion of CQs 338 may include determining that no existing SQs 336 are associated with the target CQ 338, and then clearing any registers at the DSD 360 associated with the CQ 338 and optionally sending the host 102 a completion indicator that the CQ 338 has been deleted. In order to delete a SQ 336, the storage controller 104 may implement the queue deletion command by aborting all commands associated with the selected SQ 336.

An example process for aborting a command in response to a queue deletion command is now described. The receiving unit 311 may obtain a command from the host 102, and determine whether the received command includes an queue deletion command. Queue deletion commands may include admin commands placed into the admin SQ 332, and may identify a selected queue for deletion. The queue deletion command may have its own command ID, SQ ID, and other information identifying the queue deletion command itself. In addition, the queue deletion command may also include an SQ ID identifying the selected queue to delete, an identifier for the storage controller associated with the selected queue out of a plurality of storage controllers of the DSD 360, or other information. For example, the DSD 360 may have four storage controllers, and each storage controller may have up to six associated submission queues. A host may therefore create a queue deletion command in the admin submission queue 332, identifying a storage controller ID 2 and a SQ ID 5, directing the DSD 360 to delete the fifth SQ 336 associated with the second storage controller.

When the receiving unit 311 receives a queue deletion command, the receiving unit 311 may pass the command to the CPU 306. Based on the queue deletion command, the CPU 306 may generate one or more abort indicators corresponding to the selected queue at the receiving unit 311, the completion unit 320, or both. The abort indicators may direct the receiving unit 311 to not receive any further commands from the selected queue, and direct the completion unit 320 to prevent any commands from the selected queue from being completed and returned to the host 102 once the indicators are set.

The CPU 306 may generate the abort indicators by updating one or more abort registers 322 and 324 at the receiving unit 311, at the completion unit 320, or both. The receiving unit 311 and the completion unit 320 comprise circuits including a small amount of data storage dedicated to abort registers 322 and 324. The abort registers 322 and 324 may be updated with information identifying commands designated for aborting, queues designated for deletion, functions designated for resetting, or any combination thereof. A host may direct the storage controller 104 to abort individual commands, in which case the abort registers 322 and 324 may be updated with a command ID of a specific command. When a host 102 has directed the deletion of an entire queue, the CPU 306 may store an abort tracking indicator identifying the selected queue, such as an SQ ID, to the abort registers 322 and 324. Rather than or in addition to an abort register, the receiving unit 311, the completion unit 320, or both may have registers or other data storage structures for each command queue or submission queue 336 assigned to the storage controller 104. The CPU 306 may set a "delete" bit or flag for a selected register in response to a delete queue command. Other indicators for queue deletion are also possible.

When a selected queue is identified for deletion to the receiving unit 311, the receiving unit may stop fetching any commands from the selected queue, dropping the selected queue from command or queue priority arbitration. Dropping the selected queue from arbitration may prevent any new commands from the selected queue from being received and requiring aborting.

When the completion unit 320 receives a command for which processing has completed, it may compare a command queue identifier (e.g. an SQ ID) associated with the received command against any abort tracking indicators stored in the abort registers 324. If there is no match, the completion unit 320 may notify the host that the command finished processing, such as by storing an indication to a CQ 338. However, if the command queue identifier associated with the received command does match an SQ identified by the abort registers 324, the completion unit 320 may not submit a command completion notification to the host 102, and may instead notify the CPU 306 that a command associated with a queue selected for deletion was located and aborted.

In addition to setting the abort registers 322 and 324, the CPU 306 may search for any commands pending at the storage controller 104 and associated with the queue selected for deletion. The CPU 306 may search the command table 340 for commands having an associated SQ ID that matches the selected queue. The CPU 306 may also verify that a storage controller ID for the command matches the storage controller ID identified in the queue deletion command, for example in embodiments where multiple storage controllers share a command table 340. For each command with a matching SQ ID (and optionally storage controller ID) found in the command table 340, the CPU 306 may set an abort flag or bit in the selected command's data structure. When engines 312 of the I/O pipeline 310 receive a command for processing, they may look the command up in the command table 340. The engines 312 can then detect that the "abort" bit has been set, and may abort execution of the command. The engine 312 may send an indicator to the CPU 306 that a command associated with the selected queue has been aborted. In this manner the storage controller 104 can abort commands without disrupting the execution of other pending commands, even when commands are executed out-of-order and the CPU 306 does not know where a command is in the I/O pipeline 310.

If the storage controller 104 had finished processing a command via the I/O pipeline 310 before the CPU 306 located the command in the command table 340, setting the abort pending bit in the table may be too late to abort the command at an I/O pipeline engine 312. By setting an abort register 324 at the completion unit 320 before searching the command table 340, the completion unit 320 can still catch and abort the command as it completes.

In some implementations, the receiving unit 311 may be in the process of receiving one or more commands from the selected SQ 336 when the CPU 306 generates an abort indicator in the abort registers 322. While the receiving unit 311 may not begin receiving any new commands from the selected CQ 336, the receiving unit 311 may still complete the process of receiving any commands already in progress. This may result in the receiving unit 311 generating a data structure for the received command to store to the command table 340 after the CPU 306 has begun or completed its search of the table 340. Accordingly, the receiving unit 311 may be configured to set the abort bit in the data structure of any command that finishes being received after a corresponding abort indicator is set in the abort registers 322. The receiving unit 311 may also notify the CPU 306 about the received command, and the CPU 306 may set the abort bit. In another example, the CPU 306 may perform a second scan of the command table 340, in order to locate commands that may have been received after the initial scan was performed. In yet another example, commands received after a scan of the command table 340 may still be aborted at the completion unit 320, even if an abort bit for the command was not set.

When the CPU 306 receives an indication that a command associated with a selected queue has been aborted (e.g. from a component of the I/O pipeline 310), the CPU 306 may optionally direct the completion unit 320 to post a completion indication for the aborted command to the host 102. For example, rather than providing an indication that the command completed successfully, the completion unit 320 may store an indication to a completion queue 338 that the command was aborted. In another embodiment, no completion indication may be provided to the host 102 for individual aborted commands associated with a selected queue set for deletion.

The storage controller 104 may maintain a counter of commands associated with submission queues 336. For example, the storage controller 104, e.g. at the receiving unit 311 or CPU 306, may maintain a counter for each SQ 336 associated with the storage controller 104, incrementing the counter every time a command is received from a particular queue (e.g. via the receiving unit 311), and decrementing the counter every time a command from the particular queue is completed (e.g. via the completion unit 320). In another example, when the CPU 306 scans the command table 340 for commands having a SQ ID and storage controller ID matching the queue selected for deletion, the CPU 306 may increment a counter for each matching command located. In embodiments where commands are received after the command table 340 scan is performed, the receiving unit 311 may notify the CPU 306 about the received command so that the counter may be incremented, or the commands may be located on a subsequent scan of the command table 340.

When the CPU 306 receives a notification from a component of the I/O pipeline that a command associated with the selected queue has been aborted, the storage controller 104 may decrement the command counter for the selected queue. When the command counter reaches 0, the CPU 306 may determine that all outstanding commands for the selected queue have been aborted. The storage controller 104 may notify the host 102 that the queue deletion command has completed successfully (e.g. via the completion unit 320 storing a command completion indicator to the admin completion queue 334). The host 102 may deallocate the memory locations associated with the selected command queue(s) in response to the command completion indicator. Example methods of deleting a command queue are also discussed in relation to FIGS. 4 and 5.

Figure 4:
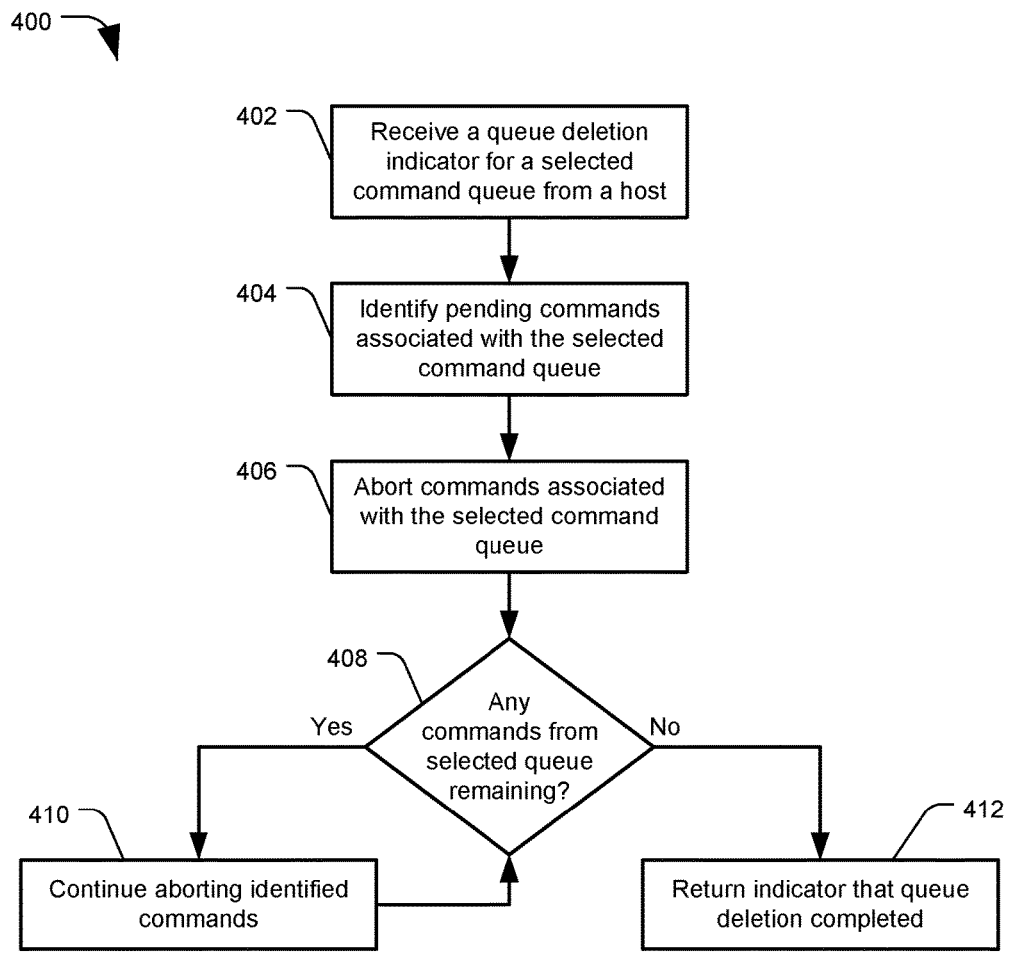
FIG. 4 is a flowchart of a method to delete a command queue, in accordance with certain embodiments of the present disclosure.

FIG. 4 is a flowchart of a method 400 to delete a command queue, in accordance with certain embodiments of the present disclosure. The method 400 may be performed by one or more components of a storage controller, such as storage controllers 104 of FIGS. 1 and 3. The method 400 may include receiving a queue deletion indicator from a host to delete a selected command queue, at 402. For example, a receiving unit of the storage controller may receive a doorbell indicator or other notice that a queue deletion command is pending at the host, and the receiving unit may retrieve the command from the host. In another example, the host may send the queue deletion command directly to the storage controller. The queue deletion command may include information such as a queue ID (e.g. a submission queue ID, SQ ID) for the selected queue designated for deletion, and a storage controller ID for the storage controller associated with the selected queue.

The method 400 may include identifying pending commands associated with the selected command queue. The storage controller may maintain a command list or table having data structures for each received host command. The data structures can include fields identifying the type of command, a command ID, an SQ ID for a queue from which the command was received, a storage controller ID identifying which of a plurality of storage controllers at a data storage device the command is intended for, other information, or any combination thereof. The storage controller may determine whether each command in the list has an SQ ID (and optionally a storage controller ID) that matches the SQ ID (and storage controller ID) identified in the queue deletion command. When a match is found, the storage controller may set an abort bit or flag in that command's data structure to '1' or 'true'.

The method 400 may include aborting commands associated with the selected command queue, at 406. As commands are processed at the storage controller, they may pass between components or engines in an I/O pipeline. When a component of the I/O pipeline receives a command for processing, the engine may consult the command table to determine whether an abort bit or flag has been set for that command. If the abort bit has been set, the engine may cease processing the command and instead send an abort indicator to a CPU of the storage controller. For each command aborted pursuant to a queue deletion command, the CPU may optionally direct a completion unit of the storage controller to send a notification to the host that the command was deleted. The command may also be removed from the command list or table, or otherwise marked as aborted.

The method 400 may include determining whether any commands from the selected queue are remaining at the storage controller, at 408. If a command is removed from the command table when it is aborted, a scan of the table can reveal when no more commands from the selected queue remain. In another embodiment, a count of outstanding commands from the selected queue may be maintained. For example, a counter may be maintained for every queue, being incremented when a new command is received and decremented when a command is completed. A count of outstanding commands may also be made when searching the command table for commands with a matching queue ID.

Every time a command from the selected queue is aborted, the counter for that queue may be decremented by 1. If the counter indicates commands from the selected queue remain, at 408, the method 400 may include continuing to abort commands from the selected queue, at 410, and monitoring for when all have been aborted, at 408. When all commands for the selected queue have been aborted, for example when the counter reaches 0, the method 400 may include returning an indicator to the host that the queue deletion command has completed, at 412.

Figure 5:
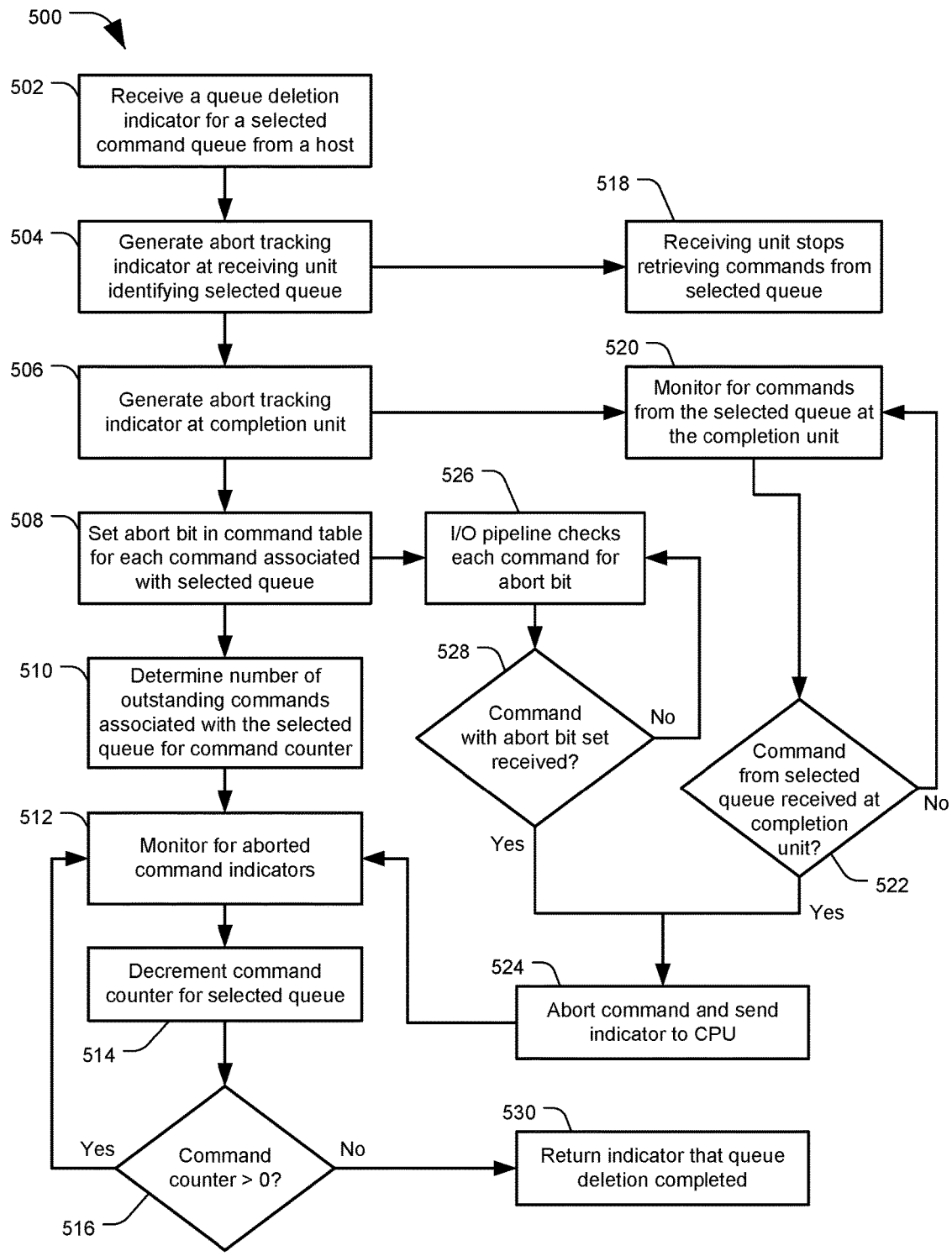
FIG. 5 is a flowchart of a method to delete a command queue, in accordance with certain embodiments of the present disclosure.

Turning now to FIG. 5, a flowchart of another method 500 to delete a command a command queue is depicted, in accordance with certain embodiments of the present disclosure. The method 500 of FIG. 5 may be performed by one or more components of a storage controller, such as storage controller 104 of FIGS. 1 and 3. Method 500 may include receiving a queue deletion indicator or command for a selected command queue from a host, at 502.

In response to receiving the queue deletion command, the storage controller (e.g. via a CPU) may generate an abort tracking indicator at a receiving unit of the storage controller at 504, the abort tracking indicator identifying the selected queue. Commands for the storage controller may be received at the receiving unit. The receiving unit may include registers to which abort indicators may be stored, such as a SQ ID for the selected queue to be deleted. At 518, the receiving unit may stop retrieving or receiving commands from any command queues identified by the abort tracking indicator.

The method 500 may include generating an abort tracking indicator at the completion unit, at 506. The completion unit may receive commands that have finished processing and issue command status notifications to a host device. The abort tracking indicator may be generated by storing information about the selected queue to a register or other memory accessible by the completion unit.

At 508, the method 500 may include setting an abort bit in a command table for each command associated with the selected queue. Locating associated commands and setting an abort bit may be performed as described in regards to 404 of method 400.

The method 500 may include determining a number of outstanding commands associated with the selected queue to set a command counter, at 510. As described previously, a command counter value may be set by counting a number of commands in a command table associated with the selected queue. In another implementation a command counter may be maintained for each submission queue, and increased when commands are received and decreased when commands are completed or aborted.

The method 500 may include monitoring for aborted command indicators, at 512. Components of the storage controller, such as engines or modules of an I/O processing pipeline, may abort commands identified as associated with the selected queue, and notify a CPU of the storage controller.

For example, at 520 the completion unit may monitor completing commands for commands associated with the selected queue (e.g. based on comparing an SQ ID associated with the command to the abort tracking indicator set at 506). The completion unit may determine whether a received command is from the selected queue, at 522. If not, the completion unit may resume monitoring completing commands, at 520. If the command is from the selected queue, the completion unit may abort the command and send a command aborted indicator to the CPU, at 524.

Similarly, at 526 the processing components, modules, or engines of an I/O pipeline may check a command table to determine whether a processing command had an abort bit set at 508. If the command does not have an abort bit set, at 528, the method 500 may include performing processing on the command and continuing to check for abort bits on subsequent commands, at 526. If a command with an abort bit is found, at 528, the I/O pipeline engine may cease processing the command, and send an abort indicator to the CPU, at 524.

Abort indicators generated at 524 may be received by a CPU at 512, while monitoring for abort indicators. In response to receiving an abort indicator, the method 500 may include decrementing the command counter for the selected queue. The aborted command may be removed from the command table, and an abort indicator may be returned to the host for the command.

The method 500 may include determining whether the command counter is greater than 0, at 516, indicating that commands still remain pending for the selected queue. If the command counter is greater than 0, the method 500 may include continuing to monitor for aborted command indicators, at 512. If the counter is not greater than 0, then a determination may be made that all pending commands for the selected queue have been aborted. The method 500 may then include returning a completion indicator to notify the host that the queue deletion command has completed. The queue stored at the host device may then be deallocated or erased by the host.

Using the methods disclosed herein, a storage controller may locate and abort commands associated with a queue selected for deletion, even in out-of-order processing environments, and without interrupting processing for other commands. The depicted methods and systems are exemplary, and modifications, exclusions, or additions may be made the methods and systems without departing from the scope of this disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit having an input/output (I/O) pipeline configured to process commands via sequential components of the I/O pipeline, including:
   a receiving unit configured to receive commands from a plurality of command queues located at a host device;
   a plurality of processing engines configured to execute commands in sequence, with each command progressing from one processing engine to a next processing engine;
   a completion unit distinct from the receiving unit configured to receive a notification once processing of a command completes and to notify the host device that processing on the command has completed;
   the circuit configured to:
   receive a queue deletion indicator from the host device via the receiving unit, the queue deletion indicator including a queue identifier for a selected command
queue from the plurality of command queues to be
deleted;
locate and abort each command associated with the
selected command queue and pending at the apparatus based on the queue identifier, including:
directing the receiving unit to stop receiving commands from the selected command queue to prevent receipt of any new commands from the
selected command queue;
directing the completion unit to abort any command
received at the completion unit that is associated
with the selected command queue to prevent the
completion of any commands from the selected
command queue;
setting an abort bit to "true" for each command
associated with the selected command queue in a
command table, which the processing engines are
configured to check when commands are received
along the I/O pipeline at the processing engines,
and abort any command with an abort bit set to
"true";
verify that no commands associated with the selected
command queue remain pending at the apparatus;
and
send a completion indicator to notify the host device
that the selected command queue is deleted.

2. The apparatus of claim 1, further comprising:
the circuit further configured to:
store a first abort tracking indicator to a first register of
the receiving unit of the circuit, the first abort tracking indicator identifying the selected command
queue; and
the receiving unit configured to stop receiving commands
from the selected command queue based on the first
abort tracking indicator.

3. The apparatus of claim 2, further comprising:
the circuit further configured to:
store a second abort tracking indicator to a second
register of the completion unit of the circuit, the
second abort tracking indicator identifying the
selected command queue;
the completion unit configured to abort commands associated with the selected command queue, including:
receive a command that has been executed at the
apparatus;
compare a command queue identifier associated with
the command to the selected command queue based
on the second abort tracking indicator; and
abort the command when the command queue identifier
matches the selected command queue.

4. The apparatus of claim 3, further comprising:
aborting each command includes:
identify commands associated with the selected command queue by comparing the queue identifier
against command queue identifiers of commands in
the command table stored to a memory accessible by
the circuit; and
set the abort bit to "true" for each command associated
with the selected command queue.

5. The apparatus of claim 4, further comprising:
a host interface to communicate with the host device
external to the apparatus;
a nonvolatile memory;
the circuit includes a data storage controller configured to
execute input/output (I/O) operations to the nonvolatile
memory, further including:

a controller interface to communicate with the host
interface;
a central processing unit (CPU) configured to:
store the first abort tracking indicator to the first
register;
store the second abort tracking indicator to the
second register; and
verify that no commands associated with the selected
command queue remain pending at the apparatus.

6. The apparatus of claim 5, further comprising:
the completion unit and the processing engines further
configured to generate an abort notification after aborting a command;
verifying that no commands associated with the selected
command queue remain pending includes:
maintain a command counter to indicate a number of
commands associated with the selected command
queue that remain pending at the apparatus;
decrease the command counter for each abort notification; and
determine that no commands associated with the
selected command queue remain pending when the
command counter reaches 0.

7. The apparatus of claim 1 further comprising:
the circuit further configured to:
receive commands from a plurality of command queues
including the selected command queue; and
abort each command associated with the selected command queue without interrupting performance of
commands associated with other command queues
from the plurality of command queues.

8. An apparatus comprising:
a host interface to connect to a host device;
a storage control circuit having an input/output (I/O)
pipeline configured to process commands via sequential components of the I/O pipeline, including:
a receiving unit configured to receive commands from
a plurality of command queues located at the host
device;
a plurality of processing engines configured to execute
commands in sequence, with each command progressing from one processing engine to a next processing engine;
a completion unit distinct from the receiving unit
configured to receive a notification once processing
of a command completes and to notify the host
device that processing on the command has completed;
the storage control circuit configured to:
receive a queue deletion command from the host device
via the host interface, the queue deletion command
including a queue identifier for a selected command
queue from the plurality of command queues to be
deleted;
abort each command associated with the selected command queue and pending at the apparatus based on
the queue identifier, including:
directing the receiving unit to stop receiving commands from the selected command queue;
directing the completion unit to abort any command
received at the completion unit that is associated
with the selected command queue;
setting an abort flag to "true" for each command
associated with the selected command queue in a
command table, and the processing engines are
configured to check the command table when commands are received for processing and abort any command with an abort flag set to "true"; and send a completion indicator to notify the host device that the selected command queue is deleted after every command associated with the selected command queue is aborted.

9. The apparatus of claim 8, further comprising:

the storage control circuit further configured to:

store an abort tracking indicator to a register of the receiving unit of the storage control circuit, the abort tracking indicator identifying the selected command queue; and the receiving unit configured to check the register of the receiving unit and stop receiving commands from the selected command queue based on the abort tracking indicator.

10. The apparatus of claim 8, further comprising:

the storage control circuit further configured to:

store an abort tracking indicator to the completion unit of the storage control circuit, the abort tracking indicator identifying the selected command queue;

the completion unit configured to abort commands associated with the selected command queue, including:

receive a command that has been executed at the apparatus;

compare a command queue identifier associated with the command to the selected command queue based on the abort tracking indicator; and abort the command when the command queue identifier matches the selected command queue.

11. The apparatus of claim 8, further comprising:

aborting each command includes:

identify commands associated with the selected command queue by comparing the queue identifier against command queue identifiers of commands in the command table; and set the abort flag to "true" for each command associated with the selected command queue.

12. The apparatus of claim 8, comprising the storage circuit further configured to:

verify that no commands associated with the selected command queue remain pending, including:

maintain a command counter to track a number of commands associated with the selected command queue that remain pending at the apparatus;

decrease the command counter as each command is aborted; and determine that no commands associated with the selected command queue remain pending when the command counter reaches 0.

13. The apparatus of claim 8, the storage controller circuit further configured to:

maintain a separate command counter for each command queue from the plurality of command queues;

increase a selected command counter for a particular command queue from the plurality of command queues when a command is received from the particular command queue;

decrease the selected command counter for a particular command queue when an abort notification is generated for a command associated with the particular command queue; and abort each command associated with the selected command queue without interrupting performance of commands associated with other command queues from the plurality of command queues.

14. A method comprising:

receiving commands from a host via a data storage device having an input/output (I/O) pipeline configured to process commands via sequential components of the I/O pipeline, that includes:

a receiving unit configured to receive commands from a plurality of command queues located at the host device via a receiving unit;

a plurality of processing engines configured to execute commands in sequence, with each command progressing from one processing engine to a next processing engine;

a completion unit distinct from the receiving unit configured to receive a notification once processing of a command completes and to notify the host device that processing on the command has completed;

receiving a queue deletion command at a controller circuit of the data storage device from the host device via the receiving unit, the queue deletion command including a queue identifier for a selected command queue among the plurality of command queues to be deleted;

aborting each command associated with the selected command queue and pending at the controller circuit based on the queue identifier, including:

directing the receiving unit to stop receiving commands from the selected command queue;

directing the completion unit to abort any command received at the completion unit that is associated with the selected command queue;

setting an abort bit to "true" for each command associated with the selected command queue in a command table, and the processing engines are configured to check the command table when commands are received for processing and abort any command with an abort bit set to "true"; and sending a completion indicator to notify the host device that the selected command queue is deleted after each command associated with the selected command queue is aborted.

15. The method of claim 14 further comprising:

storing an abort tracking indicator to a register of the receiving unit, the abort tracking indicator identifying the selected command queue; and stopping receipt of commands from the selected command queue at the receiving unit based on storing the abort tracking indicator to the register of the receiving unit.

16. The method of claim 14 further comprising:

storing an abort tracking indicator to the completion unit, the abort tracking indicator identifying the selected command queue for which associated commands are to be aborted;

receiving a command at the completion unit that has been executed at the controller circuit;

comparing a command queue identifier associated with the command to the selected command queue based on the abort tracking indicator; and aborting the command when the command queue identifier matches the selected command queue.

17. The method of claim 14 further comprising:

identifying commands associated with the selected command queue by comparing the queue identifier against command queue identifiers of commands in a command table; and setting an abort flag to "true" for each command associated with the selected command queue.

18. The method of claim 14 further comprising:
verifying that no commands associated with the selected command queue remain pending including:
- maintaining a command counter to track a number of commands associated with the selected command queue that remain pending at the controller circuit;
- decreasing the command counter as each command is aborted; and
- determining that no commands associated with the selected command queue remain pending when the command counter reaches 0.

19. The method of claim 14 further comprising:
aborting each command associated with the selected command queue without interrupting performance of commands associated with other command queues from the plurality of command queues.

\* \* \* \* \*